US005951888A

United States Patent [19]
Oakley

[11] Patent Number: 5,951,888

[45] Date of Patent: Sep. 14, 1999

[54] PLASMA ELECTRODE WITH ARC-STARTING GROOVES

[75] Inventor: Thomas Franklin Oakley, Florence, S.C.

[73] Assignee: The Esab Group, Inc., Florence, S.C.

[21] Appl. No.: 09/112,873

[22] Filed: Jul. 9, 1998

[51] Int. Cl.[6] ........ B23K 10/00

[52] U.S. Cl. ........ 219/121.52; 219/75; 219/119; 219/121.48; 313/231.41

[58] Field of Search ........ 219/121.52, 121.39, 219/119, 74, 75, 121.48, 121.49; 313/231.31, 231.41, 231.51

[56] References Cited

U.S. PATENT DOCUMENTS

| | | |
|---|---|---|
| 3,592,994 | 7/1971 | Ford . |
| 3,676,639 | 7/1972 | Esiban et al. . |
| 3,780,259 | 12/1973 | Meyer . |
| 3,930,139 | 12/1975 | Bykhovsky et al. . |
| 4,133,987 | 1/1979 | Lakomsky et al. . |
| 4,521,666 | 6/1985 | Severance, Jr. et al. . |
| 4,701,590 | 10/1987 | Hatch . |
| 4,766,349 | 8/1988 | Johansson et al. . |
| 4,782,210 | 11/1988 | Nelson et al. . |
| 5,023,425 | 6/1991 | Severance, Jr. . |
| 5,097,111 | 3/1992 | Severance, Jr. . |
| 5,105,061 | 4/1992 | Blankenship . |
| 5,164,569 | 11/1992 | Porra et al. . |
| 5,304,769 | 4/1994 | Ikegami et al. . |
| 5,310,988 | 5/1994 | Couch, Jr. et al. . |
| 5,416,296 | 5/1995 | Walters . |
| 5,451,739 | 9/1995 | Nemchinsky et al. . |
| 5,464,962 | 11/1995 | Luo et al. . |
| 5,726,414 | 3/1998 | Kitahashi et al. . |

*Primary Examiner*—Mark Paschall
*Attorney, Agent, or Firm*—Alston & Bird, LLP

[57] ABSTRACT

An electrode and a plasma arc torch are provided wherein the useful service life of the electrode is extended and the starting ability of the torch is improved because the arc is transferred from an initiation point to a final attaching point which is centered on the electrode. The electrode includes a generally cylindrical body defining a longitudinal axis and having a substantially planar front face that is perpendicular to the longitudinal axis. The front face has a central region at which the arc is to be supported after initiation of the arc. The front face further defines at least one groove extending radially inward for guiding the arc from the point of initiation along the front face toward the central region. Because the arc easily and quickly moves from its initiation point to the central region of the electrode along the groove, starting ability of the plasma arc torch is improved and service life of the electrode is lengthened. Moreover, because the arc is directed to an optimal steady state attaching point in the central region of the electrode, electrode wear due to non-optimum attaching position is reduced, thereby further extending the useful electrode service life.

27 Claims, 4 Drawing Sheets

PLASMA ELECTRODE WITH ARC-STARTING GROOVES

FIELD OF THE INVENTION

The present invention relates to plasma arc torches and more particularly to electrodes for use in plasma arc torches.

BACKGROUND OF THE INVENTION

Plasma arc torches are commonly used for the working of metals, including cutting, welding, surface treatment, melting, and annealing. Typically, the working end of such torches consists of an elongated body having a generally cylindrical electrode located along the longitudinal axis of the working end. The working end of these torches often terminates in a nozzle that is separated from the electrode by a gas passage. The nozzle is electrically conductive and is insulated from the electrode so that an electrical potential difference can be established between the electrode and the nozzle for starting the torch.

To start the torch, one side of an electrical source, typically the cathode side, is connected to the electrode and the other side, typically the anode side, is connected to the nozzle through a switch and a resistor. The anode side is also connected in parallel to the workpiece. The starter circuit imposes a high voltage and high frequency potential difference across the electrode and nozzle, causing an electric arc to be established across the gas passage therebetween. This arc, commonly referred to as the pilot arc or non-transferred arc, has a relatively high frequency and high voltage but a relatively low current to avoid damaging the torch. Typically, the starter circuit in plasma arc torch control systems remains "on" until a pilot arc is detected, which can take a considerable amount of time after initiation of the starter circuit.

U.S. Pat. No. 4,782,210 to Nelson et al. attempts to minimize the starting voltage required for creating a pilot arc by using knurled ridges having sharp pointed edges on the side surface of the electrode. These ridges are oriented substantially along the flow lines of the plasma gas. The sharp edges enhance local electric fields to promote initiation of the pilot arc between the side surface of the electrode and the nozzle.

Once a pilot arc is created, the gas passing between the electrode and the nozzle is partially ionized. This ionized gas flows through thu nozzle and out of the working end of the torch. When the torch is moved close to a metallic workpiece, the ionized gas flowing from the working end toward the workpiece causes the arc to transfer off of the nozzle and on to the workpiece, which acts as an anode. This arc is referred to as the cutting arc, transferred arc, or main arc.

After the main arc is established, the switch connecting the potential source to the nozzle is opened and the power supplied to the torch is increased to create a main arc which is of a higher current than the pilot arc. The main arc is constricted in the nozzle as it extends from the electrode to the workpiece, thereby creating a high temperature plasma flow which heats the workpiece.

The electrode used in torches of the type described typically comprises a water-cooled elongate member composed of a material having high thermal conductivity, such as copper or a copper alloy. The discharge end of conventional electrodes is usually a flat smooth surface. An emissive element may be embedded in the flat surface for supporting the arc. The element is composed of a material which has a relatively low work function, defined in the art as the potential step, measured in electron volts, which permits thermionic emission from the surface of a metal at a given temperature. In view of its low work function, the element is capable of readily emitting electrons when an electrical potential is applied thereto. Preferred emissive element materials include hafnium, zirconium, or tungsten.

The electrode of a plasma arc torch is a consumable item, however, and thus it is desirable to increase electrode service life, particularly when the torch is used with an oxidizing or reactive gas such as oxygen or air. At least two factors contribute to the limits of the service life of the electrode. First, oxidizing gases tend to rapidly oxidize the copper in the electrode and as the copper oxidizes its work function falls. As a result, the oxidized copper which surrounds the emissive element begins to support the arc in preference to the element. When this happens, the copper oxide and the surrounding copper melt, resulting in the early destruction and failure of the electrode.

Second, the arc itself causes erosion of the electrode or emissive element at the arc attaching point. This is believed to be caused by the high temperature of the arc melting the material at the arc attachment point. Indeed, electrodes in plasma arc torches of the type described typically exhibit a concave erosion pit at the arc attachment point over time as the torch operates.

A pilot arc is often started on the cylindrical side surface of the electrode and then it migrates across the face of the electrode to the emissive element whereupon the arc is transferred to the workpiece. Testing has shown that, upon the first "start" of an electrode, the arc creates a trail as it moves across the electrode face to a point from which the arc is transferred to the workpiece. This point may not necessarily be in the exact center of the element.

In addition, for subsequent starts, the arc will frequently travel along the same trail and atransfer to the workpiece at the same, often uncentered point. This creates a problem because, as the electrode is operated, the concave erosion pit gradually increases in size. If the arc is not centered in the emissive element, the erosion pit caused by the arc will extend more quickly to the interface between the emissive material and the copper. When this happens, the arc will likely attach to the oxidized copper in preference to the emissive element, resulting in electrode damage or failure. Thus, it is desirable to ensure that the erosion pit begins at the exact center of the emissive element to maximize electrode life.

In U.S. Pat. No. 5,464,962 to Luo et al. and U.S. Pat. No. 5,726,414 to Kitahashi et al., the emissive surface of the electrode has a hole or recess preformed in the central region thereof. The predetermined recess in the Luo patent, the dimension of which is a function of the operating current of the torch, the diameter of the emissive element, and the plasma gas flow pattern, is said to reduce deposition of the high thermionic emissivity material on the nozzle during torch operation. The structure of the electrode in the Kitahashi patent is said to stabilize the main arc at a readily fixed cathodic point.

These electrode designs do not, however, ensure that the main arc attachment point always occurs in the central region of the emissive element. Instead, these patents are directed to minimizing erosion by the arc (Luo) or stabilizing the position of the arc (Kitahashi) when the arc has been attached to the center point of the electrode.

Accordingly, there is a need in the art for an electrode that facilitates arc starting and rapid transfer of the pilot arc to a main arc. Such an electrode would advantageously minimize deterioration by ensuring attachment of the main arc to the center of the emissive element. In this way, the concave erosion pit caused by the arc will be centered on the emissive element and the pit can deepen for the maximum amount of arc time before the main arc attaches itself to the adjoining copper material and destroys the electrode.

SUMMARY OF THE INVENTION

The present invention solves the problems identified above by providing one or more grooves in the substantially planar front face of the electrode. The inventor has discovered that such grooves will provide a path for the high voltage arc to transfer from a pilot arc to a main arc attached at the center of the electrode. The grooves of the present invention guide the transition of an arc from the pilot arc initiation point at one side of the electrode to an optimal "first time" main arc attachment point at the center of the emissive element.

The time required for the pilot arc to establish is reduced in electrodes of the present invention and thus starter circuit "on" time is reduced. This is advantageous because testing has demonstrated that reducing the amount of time that the starting circuit remains "on" reduces electrode and nozzle erosion. The overall starting reliability of plasma arc torches fitted with the electrode of the present invention is also improved.

More particularly, the present invention comprises an electrode adapted for supporting an arc in a plasma arc torch that comprises a substantially cylindrical body having a rear end that attaches to a plasma arc torch and a front end from which an arc is initiated at a point thereon at the commencement of torch operation. The front end of this embodiment further comprises a substantially planar front face that is perpendicular to the longitudinal axis of the electrode body. The front face, from which the arc is supported after initiation of the arc, defines at least one groove extending radially inward for guiding an arc from the point of initiation along the front face toward the central region of the front face. In embodiments wherein the electrode has an emissive element, the grooves extend across the face of both the cylindrical body and the emissive element.

The electrode may also include a separator formed of a relatively non-emissive material, such as silver, between the cylindrical body material and the emissive element to prevent the main arc from moving from the emissive element to the body material during cutting operations. When present, however, the separator also hinders transition of an arc from the pilot arc initiation point at one side of the electrode to the optimal main arc attachment point at the center of the emissive element. The grooves of the present invention overcome this problem by extending across the separator to guide the arc from the cylindrical body to the emissive element.

Either a single groove or a plurality of grooves may be used on electrodes of the present invention and each groove can have a cross-section that is either V-shaped or in the shape of a square channel. The grooves may be straight, arcuate, or partially arcuate. A cavity may be provided in the central region of the front face.

In a preferred embodiment, the groove extends completely from the peripheral edge of the front face to the central region. The groove can also be wider at the peripheral edge than at the central region. Furthermore, the groove can be deeper at the peripheral edge than at the central region.

Advantageously, the present invention increases the service life of plasma arc torch electrodes by facilitating pilot arc starting and minimizing starter circuit "on" time after initiation of the pilot arc. Also, the present invention increases electrode service life by guiding transition of the pilot arc from its initiation point at one side of the electrode to an optimal "first time" main arc attachment point at the center of the emissive element, thereby ensuring attachment of the main arc to the center of the emissive material.

BRIEF DESCRIPTION OF THE DRAWINGS

For a more complete understanding of this invention reference should now be had to the preferred embodiments illustrated in greater detail in the accompanying drawings, which are not necessarily to scale, and described below.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that the disclosure will be thorough and complete, and will fully convey the scope of the invention to those skilled in the art.

Figure 1:
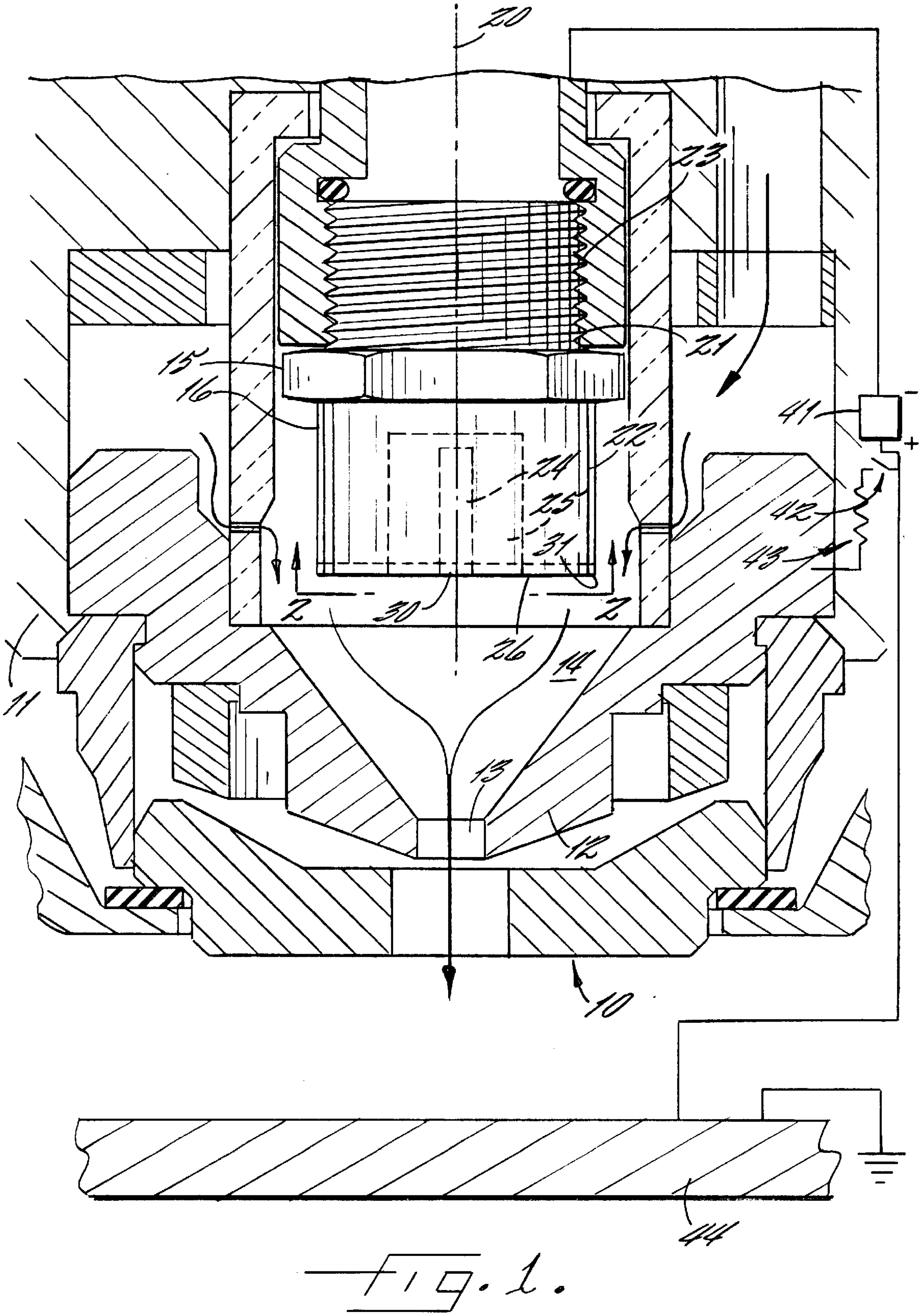
FIG. 1 is a partial sectional view of a plasma arc torch which embodies the present invention.

FIG. 1 illustrates a preferred embodiment of a plasma arc torch 10 according to the present invention. A torch housing 11 is provided having a working end that is placed adjacent to a metallic workpiece 44. A nozzle 12 having a bore 13 is secured on the working end of the torch housing. Adjacent the nozzle 12, and in communication with the bore 13, is a gas flow passage 14. A flow of gas to be ionized is generated by a gas flow generator (not shown) in such a way as to force the gas to be ionized through the gas flow passage 14 adjacent the nozzle 12 and out through the nozzle bore 13 toward the workpiece 44. The gas to be ionized may be a reactive gas, such as oxygen or gas, or a non-reactive gas such as argon or nitrogen.

Adjacent the gas flow passage is an electrode 15 according to the present invention. The electrode 15 comprises a substantially cylindrical body 16 preferably made of copper or a copper alloy having a longitudinal axis 20 corresponding to the longitudinal axis of the torch. The substantially cylindrical body further comprises a rear end 21 for attaching to a plasma arc torch and a front end 22 from which an arc is initiated at a point thereon at commencement of the torch operation. In FIG. 1, the rear end 21 of the electrode 15 includes threads 23 for attaching the electrode to the torch; however, the present invention is not limited to the use of threads for attaching the electrode, and those skilled in the art would appreciate that other attachment mechanisms may be used.

In a preferred embodiment, there is also secured in the front end of the cylindrical body 16 an emissive element 24. The emissive element 24 is composed of a metallic material which has a relatively low work function and so is adapted to readily emit electrons upon an electrical potential being applied thereto. Suitable examples of such materials are hafnium, zirconium, tungsten, and alloys thereof. Tungsten, however, is not well suited for a reactive gas environment and thus zirconium, or preferably hafnium, should be used for the element material in torches using reactive gases. Once in steady state, the main arc will attach to the emissive element.

In another preferred embodiment, there is also secured in the front end of the cylindrical body a relatively non-emissive separator 25 such is disclosed in U.S. Pat. No. 5,023,425 issued to Severance, Jr. on Jun. 11, 1991, which is assigned to the same assignee as the present invention and which is hereby incorporated by reference. The separator 25 of the present invention has a work function greater than that of the emissive element 24 and serves to radially separate the cylindrical body 16 from the emissive element to resist movement of the arc from the emissive element to the body after the main arc has achieved steady state.

The separator 25 is composed of a metallic material and preferably a material having a high thermal conductivity, high resistance to oxidation, high melting point, high work function, and low cost. While no one material possess all of these qualities, the following materials are suitable for use in the separator: silver, gold, platinum, rhodium, iridium, palladium, and nickel. Of these, silver is a preferred material and may be used for the separator as long as the electrode is well cooled. Alloys of these materials with others, such as copper, are also suitable for use in the separator.

As can be appreciated from FIG. 1, the emissive element 24 and the separator 25 are secured in the front end 22 of the cylindrical body 16 such that the cylindrical body, the separator, and the emissive element together define a substantially planar front face 26 of the electrode that is perpendicular to the longitudinal axis of the cylindrical body. Moreover, the substantially planar front face 26 also defines a central region 30.

In this application, the term "central region" is used to define that portion of the substantially planar front face adjacent to the geometric center point of the electrode front face. Thus, the central region generally circumscribes the geometric center point but the central region is not intended to be limited to a single point at the exact center of the electrode, such as may be the case with electrodes having a non-circular face.

As shown in FIG. 1, one side of an electrical source 41, typically the cathode side, is electrically connected with the electrode cylindrical body 16, and the other side, typically the anode side, of the source 41 is electrically connected to the nozzle 12 through a switch 42 and a resistor 43. The anode side is also connected in parallel to the workpiece 44.

Operationally, the plasma arc torch of the present invention has two modes. In the pilot arc mode, the gas flow generator generates a flow of gas to be ionized through the gas flow passage 14 between the electrode 15 and the nozzle 12. The electrical source 41 creates a high voltage and high frequency electrical potential difference across the electrode and nozzle, causing a pilot arc to be established across the gas flow passage 14 which partially ionizes gas flowing in the passage. Testing has shown that the pilot arc may first attach to the electrode at the peripheral edge 31 of the substantially planar front face or immediately adjacent thereto either on the side surface or on the front face.

In the second mode, the main arc mode, the torch 10 is brought in close proximity to a metallic workpiece after a pilot arc has been established. When the working end is sufficiently close to the workpiece 44, the partially ionized gas flowing outwardly through the bore causes the pilot arc to transfer through the bore 13 of the nozzle 12 and to the workpiece. The switch 42 connecting the electrical source 41 to the nozzle 12 is then opened and the torch is in the main arc mode for performing a work operation on the workpiece. The current of the arc in the main arc mode is significantly greater than the current of the pilot arc.

When transitioning from the pilot arc mode to the main arc mode, the arc attachment point on the electrode necessarily moves from the cylindrical body 16 or peripheral edge 31, toward the central region 30 of the substantially planar front face 26. However, in conventional electrodes, the arc "finds" its own pilot arc attachment point on the periphery of the electrode as well as its own main arc attachment point on the central region of the electrode front face after the arc has transferred. As previously discussed, the main arc does not necessarily attach to the electrode's center point, which is desirable for reducing electrode wear. It is to this problem that the present invention is specifically addressed.

Figure 2:
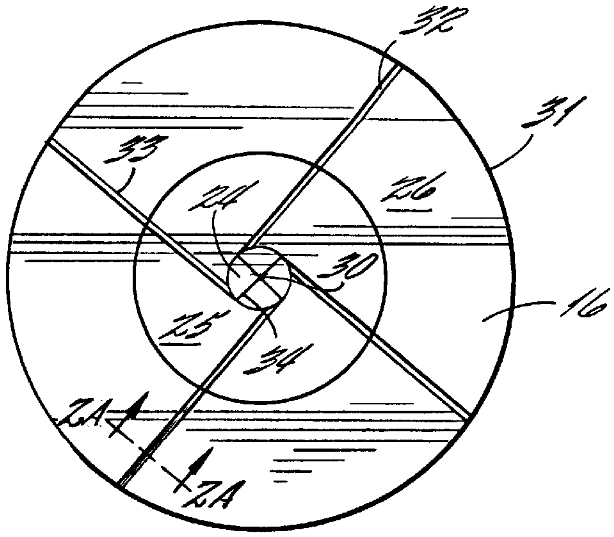
FIG. 2 is a plan view of the substantially planar front face of a preferred embodiment of the electrode of the present invention, taken along line 2—2 of FIG. 1.

As shown in FIG. 2, the present invention comprises at least one groove 32 in the substantially planar front face 26 for guiding the arc from the point of its initiation along the front face and toward the central region 30.

FIG. 2 shows the substantially planar front face 26 formed by the cylindrical electrode body 16, the separator 25, and the emissive element 24. The substantially planar front face 26 has a peripheral edge 31 and a central region 30. While the figures in the present application illustrate a preferred embodiment of the present invention wherein the electrode comprises a cylindrical body 16, a separator 25, and an emissive element 24, other preferred embodiments include an electrode comprised of just a cylindrical body and an emissive element. Common to all the embodiments of the present invention, however, is the provision for at least one groove 32 defined in the substantially planar front face 26 for guiding an arc from the point of initiation toward the central region 30. In the preferred embodiments depicted in FIGS. 2–6, the groove extends entirely from the peripheral edge 31 of the front face to the central region.

Figure 3:
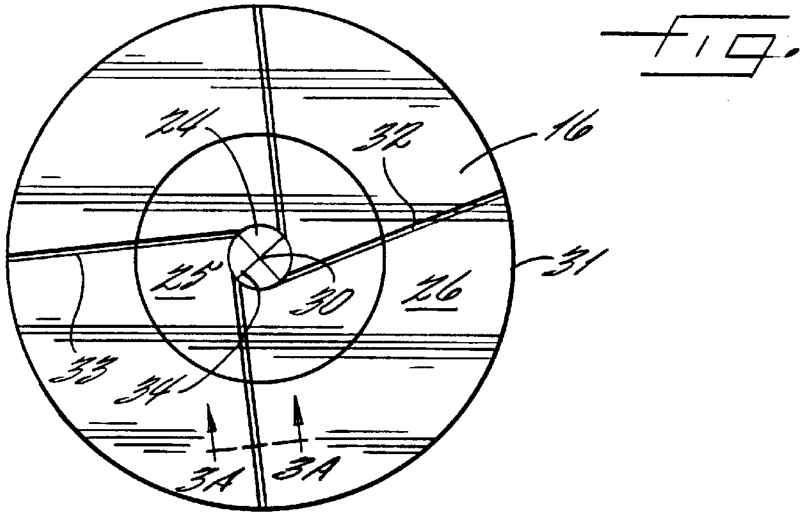
FIG. 3 is a plan view of the substantially planar front face of another preferred embodiment of the electrode of the present invention.

As illustrated in FIGS. 2 and 3, he groove 32 of the present invention may further comprise a first groove segment 33 extending across the cylindrical body 16 and across the separator 25 and an adjoining second groove segment 34 in the emissive element 24. In this preferred embodiment, the first groove segment 33 and the second groove segment 34 are adjoining but need not be colinear. It should be understood, however, that the second groove segment 34 need not be present in all embodiments.

Figure 2A:
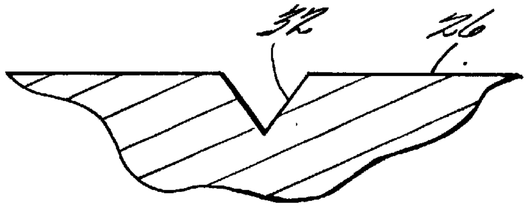
FIG. 2A is a cross-sectional view of a type of groove embodied in the present invention taken along line 2A—2A of FIG. 2.
Figure 3A:
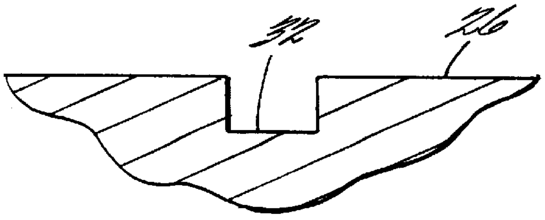
FIG. 3A is cross-sectional view of another type of groove embodied in the present invention taken along line 3A—3A of FIG. 3.

The grooves of the present invention are formed by machining either a V-shaped or a square channel groove in the substantially planar front face with a suitable apparatus such as a circular saw or an end mill. A preferred embodiment wherein the groove 32 is V-shaped is illustrated in FIG. 2A. FIG. 3A illustrates a preferred embodiment of the present invention wherein the groove 32 is in the shape of a square channel. Very favorable results have been achieved in electrodes of the present invention having a width, measured on the front face, of about 0.020 inch.

Figure 4:
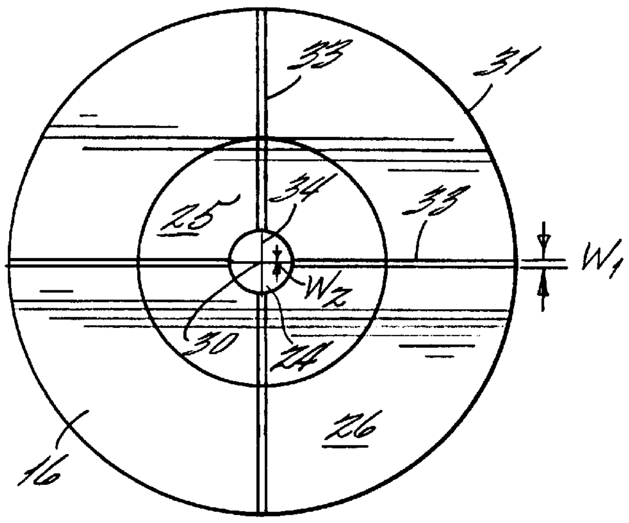
FIG. 4 is a plan view of the substantially planar front face of another preferred embodiment of the electrode of the present invention.

FIG. 4 illustrates another preferred embodiment of the present invention wherein the first groove segment 33 is colinear with the second groove segment 34. Also illustrated in FIG. 4 is a preferred embodiment of the present invention wherein each groove segment has a width in the substantially planar front face 26 and wherein the width $w_1$ of the first groove segment 33 is greater than the width $w_2$ of the second groove segment 34. This embodiment is advantageous because it allows for less removal of material from the emissive element. Removing less material from the emissive element 24 is important because, as previously mentioned, a concave erosion pit forms in the emissive element as the main arc operates. Thus, leaving as much material in the emissive element as possible extends the electrode service life. Furthermore, the reduced width of the second groove segment 34 does not reduce the effectiveness of the present invention because it has been found that once an arc begins traveling along the first groove segment 33 toward the central region 30 the arc will continue its travel along the second groove segment 34 even though the second groove segment is not as wide as the first groove segment.

Figure 5:
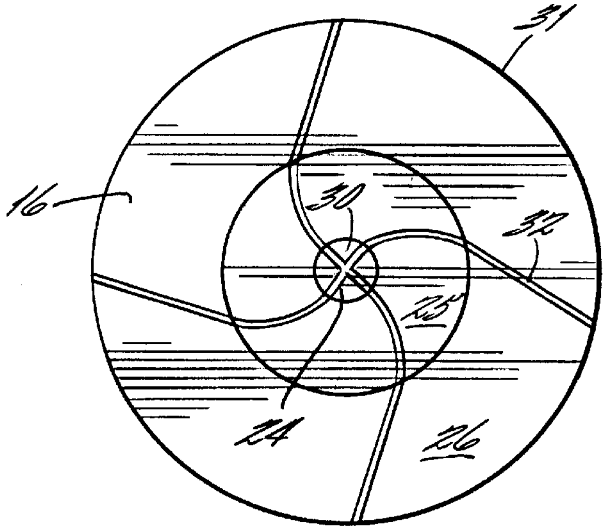
FIG. 5 is a plan view of the substantially planar front face of another preferred embodiment of the electrode of the present invention.
Figure 6:
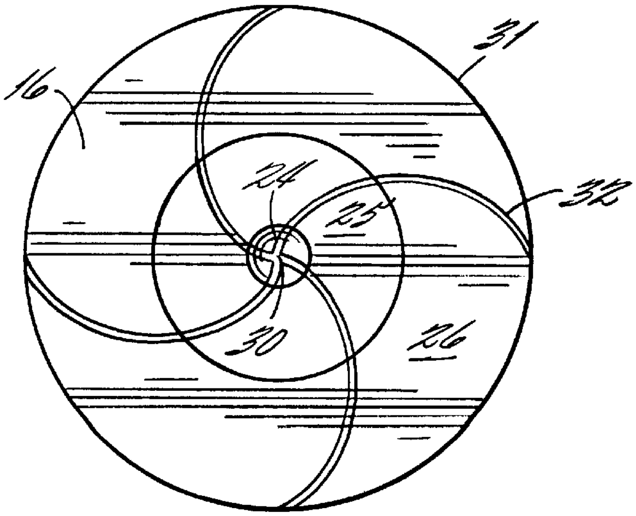
FIG. 6 is a plan view of the substantially planar front face of another preferred embodiment of the electrode of the present invention.

FIG. 5 illustrates a preferred embodiment of the present invention wherein the groove 32 is partially arcuate and FIG. 6 illustrates a preferred embodiment wherein the groove 32 is completely arcuate. It has been discovered that the path traveled by an arc during transition along the smooth face of conventional electrodes was often arcuate. It is believed that this phenomenon was caused by the vortical flow of gas over the electrode face. Accordingly, in preferred embodiments of the present invention arcuate or partially arcuate grooves 32 are cut in the substantially planar front face 26 of the electrode in a direction—clockwise or counterclockwise from the peripheral edge 31 of the front face—that corresponds to the direction of vortical gas flow over the electrode. While FIG. 6 illustrates arcuate grooves extending counterclockwise from the peripheral edge 31 of the substantially planar front face, these arcuate grooves could extend clockwise from the peripheral edge to correspond with a clockwise vortical gas flow over the electrode.

It should be noted that, while the embodiments having arcuate and partially arcuate shaped grooves are illustrated with the embodiment of the substantially planar front face 26 comprising a cylindrical body 16, a separator 25, and an emissive element 24, the arcuate or partially arcuate shaped grooves may be used with an electrode having a substantially planar front face comprised of just the cylindrical body and the emissive element.

Figure 7:
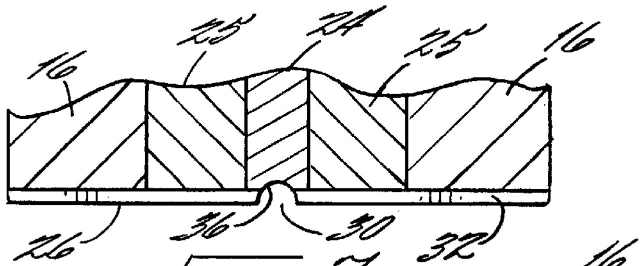
FIG. 7 is a partial sectional view of an electrode of the present invention depicting a preferred embodiment having a concave cavity in the substantially front face.
Figure 8:
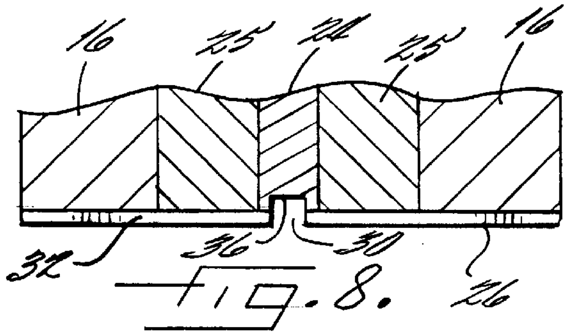
FIG. 8 is a partial sectional view of an electrode of the present invention depicting a preferred embodiment having a cylindrical cavity in the substantially front face.
Figure 9:
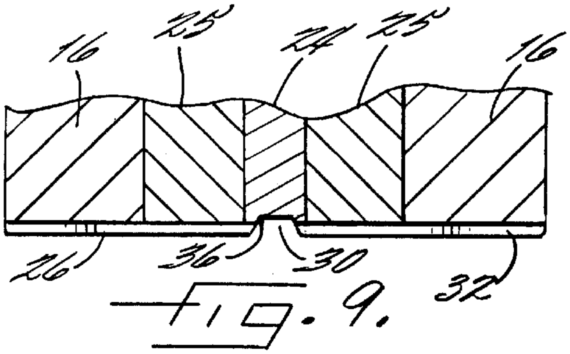
FIG. 9 is a partial sectional view of an electrode of the present invention depicting a preferred embodiment having a countersunk cavity in the substantially front face.

FIGS. 7–9 illustrate preferred embodiments of the present invention wherein the central region 30 of the substantially planar front face 26 further comprises a cavity 36 in the front face. This cavity 36 may be made by any suitable apparatus, such as a ball-end mill or drill. Very favorable results have been obtained using an electrode according to the present invention having a cavity with a depth of 0.020 inch.

FIG. 7 illustrates a preferred embodiment of the present invention wherein the cavity 36 is concave. FIG. 8 illustrates a preferred embodiment of the present invention wherein the cavity 36 is generally cylindrical. FIG. 9 illustrates a preferred embodiment of the present invention wherein the cavity 36 in the central region 30 of the substantially planar front face 26 is countersunk and has a frustoconical shape.

Figure 10:
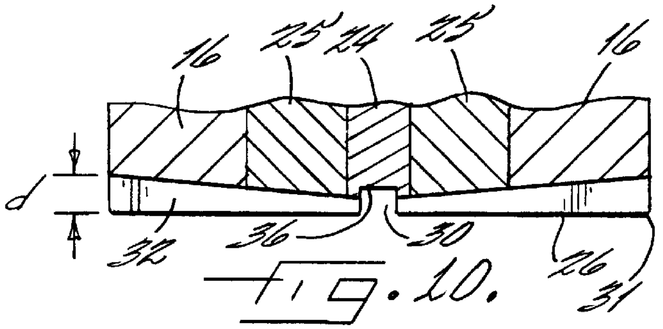
FIG. 10 is a partial sectional view of an electrode depicting a preferred embodiment of the present invention with grooves having a varying depth.

FIG. 10 illustrates a preferred embodiment of the present invention wherein the groove 32 has a depth d that gradually decreases from the peripheral edge 31 of the front face to the cavity 36. Very favorable results have been achieved with electrode grooves having a depth in the range of 0.020 to 0.010 inch.

The embodiment of the present invention wherein the depth of the groove 32 is greatest at the peripheral edge 31 allows for less material to be removed from the emissive element 24 and from the separator 25. Removing less material from the emissive element is advantageous since an erosion pit will form in the element during arc attachment and thus it is beneficial to leave as much material in the element as possible when cutting the groove.

Figure 11:
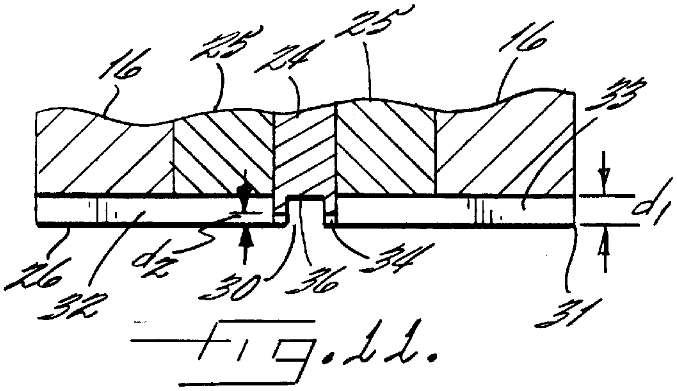
FIG. 11 is a partial sectional view of an electrode depicting another preferred embodiment of the present invention with grooves having different depths.

FIG. 11 illustrates a preferred embodiment of the present invention wherein the depth $d_1$ of the first groove segment 33 is greater than the depth $d_2$ of the second groove segment 34. Very favorable results have been achieved using an electrode with a groove depth of 0.010 inch at the peripheral edge of the substantially planar front face and a groove depth of 0.005 inch in the emissive element.

Testing has indicated that electrodes made in accordance with the present invention are advantageous for use in a plasma arc torch because the arc will travel from its initiation point along the groove provided in the substantially planar front face toward the central region of the front face. This maximizes electrode life and also improves torch starting ability. Moreover, it has also been found that starting circuit "on" time after initiation of the pilot arc is reduced in plasma arc torches utilizing electrodes of the present invention, further reducing electrode and nozzle erosion.

Many modifications and other embodiments of the invention will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

That which is claimed is:

1. An electrode adapted for supporting an arc in a plasma arc torch and comprising:

a substantially cylindrical body having a longitudinal axis, a rear end for attaching to a plasma arc torch, and a front end from which an arc is initiated at a point thereon at the commencement of the torch operation;

said front end further comprising a substantially planar front face that is perpendicular to the longitudinal axis of the cylindrical body, said front face having a central region at which the arc is to be supported after initiation of the arc; and said front face defining at least one groove in said front face extending radially inward for guiding the arc from the point of initiation along the front face and toward the central region.

2. An electrode as defined in claim 1 wherein said front end further defines a cavity at said central region.

3. An electrode as defined in claim 1 wherein the front face further defines a peripheral edge and wherein the groove begins at the peripheral edge of the front face and extends toward the central region.

4. An electrode as defined in claim 3 wherein the groove has a predetermined width in the substantially planar front face and said width is greatest at the peripheral edge of the front face.

5. An electrode as defined in claim 3 wherein the groove has a predetermined depth and said depth is greatest at the peripheral edge of the front face.

6. An electrode as defined in claim 1 wherein the front face further defines a peripheral edge and a center point and wherein the groove begins at the peripheral edge of the front face and terminates at the center point.

7. An electrode as defined in claim 1 wherein the groove has a cross section that is generally V-shaped.

8. An electrode as defined in claim 1 wherein the groove has a cross section that is generally in the shape of a square channel.

9. An electrode as defined in claim 1 wherein the groove is straight.

10. An electrode as defined in claim 1 wherein the groove is at least partially arcuate.

11. An electrode adapted for supporting an arc in a plasma arc torch and comprising:

a substantially cylindrical body having a longitudinal axis, a rear end for attaching to a plasma arc torch, and a front end from which an arc is initiated at a point thereon at the commencement of the torch operation;

an emissive element secured in the front end of said cylindrical body, said emissive element having a lower work function than the cylindrical body and being secured in said body such that said body and said emissive element together define a substantially planar front face that is perpendicular to the longitudinal axis of the cylindrical body, said front face having a central region at which the arc is to be supported after initiation of the arc; and said front face further defining at least one groove in said front face for guiding an arc from the point of initiation along the front face toward the central region.

12. An electrode as defined in claim 11 wherein said front end further defines a cavity at said central region.

13. An electrode as defined in claim 11 wherein the front face further defines a peripheral edge and wherein the groove begins at the peripheral edge of the front face and extends toward the central region.

14. An electrode as defined in claim 11 wherein the groove comprises a first groove segment extending across the cylindrical body and an adjoining second groove segment in the emissive element.

15. An electrode as defined in claim 14 wherein each groove segment has a predetermined width in the substantially planar front face and said width of the first groove segment is greater than said width of the second groove segment.

16. An electrode as defined in claim 14 wherein each groove segment has a predetermined depth and said depth of the first groove segment is greater than said depth of the second groove segment.

17. An electrode adapted for supporting an arc in a plasma arc torch and comprising:

a substantially cylindrical body having a longitudinal axis, a rear end for attaching to a plasma arc torch, and a front end from which an arc is initiated at a point thereon at the commencement of the torch operation;

an emissive element secured in the front end of said cylindrical body, said emissive element having a lower work function than the cylindrical body;

a separator secured in the front end of said cylindrical body for radially separating the body from the emissive element to resist movement of the arc from the emissive element to the body, said separator having a work function greater than that of the emissive element;

said electrode having a substantially planar front face defined by said body, said emissive element, and said separator, said substantially planar front face being perpendicular to the longitudinal axis of the cylindrical body and having a central region at which the arc is to be supported after initiation of the arc; and said front face further defining at least one groove in said front face for guiding an arc from the point of initiation along the front face toward the central region.

18. An electrode as defined in claim 17 wherein said front face further defines a cavity at said central region.

19. An electrode as defined in claim 17 wherein the front face further defines a peripheral edge and wherein the groove begins at the peripheral edge of the front face and extends toward the central region.

20. An electrode as defined in claim 17 wherein the groove comprises a first groove segment extending across the body and across the separator and an adjoining second groove segment in the emissive element.

21. An electrode as defined in claim 20 wherein each groove segment has a predetermined width in the substantially planar front face and said width of the first groove segment is greater than said width of the second groove segment.

22. An electrode as defined in claim 20 wherein each groove segment has a predetermined depth and said depth of the first groove segment is greater than said depth of the second groove segment.

23. A plasma arc torch for creating an internal pilot arc and for creating a main arc with a workpiece, said torch comprising:

a nozzle defining a bore through which the main arc is emitted to the workpiece;

a gas flow source for supplying a flow of a gas outwardly through the bore of the nozzle;

an electrical source for creating the internal pilot arc and the main arc with the workpiece; and an electrode positioned adjacent the nozzle for supporting a pilot arc between said electrode and said nozzle, and for supporting a main arc between said electrode and the workpiece through the bore of the nozzle, said electrode comprising:

a substantially cylindrical body having a longitudinal axis and a front end from which a pilot arc is initiated at a point thereon at the commencement of the torch operation;

an emissive element secured in the front end of said cylindrical body, said emissive element having a lower work function than the cylindrical body;

a substantially planar front face defined by said cylindrical body and said emissive element, said substantially planar front face being perpendicular to the longitudinal axis of the cylindrical body and having a central region at which the main arc is to be supported; and said front face further defining at least one groove in said front face for guiding the pilot arc from the point of initiation of the arc along the front face and toward the central region whereupon the arc is supported as the main arc with the workpiece.

24. A plasma arc torch as defined in claim 23 wherein said front end further defines a cavity at said central region.

25. A plasma arc torch as defined in claim 23 wherein the gas flow source supplies a vortical flow of a gas outwardly through the bore of the nozzle and further wherein at least a portion of the groove is arcuately curved in the direction of the vortical gas flow.

26. A plasma arc torch as defined in claim 23 wherein the electrical source creates a pilot arc having higher frequency than the frequency of the main arc.

27. A plasma arc torch as defined in claim 23 wherein the electrical source creates a main arc having higher current than the current of the pilot arc.

* * * * *